Oct. 14, 1947.   R. A. GIVEN   2,429,126
METHOD OF SEPARATING BUTADIENE AND ACETYLENES FROM SOLUTION
Filed Dec. 31, 1943   3 Sheets-Sheet 1

Richard A. Given Inventor
By P. L. Young Attorney

Patented Oct. 14, 1947

2,429,126

UNITED STATES PATENT OFFICE 2,429,126

METHOD OF SEPARATING BUTADIENE AND ACETYLENES FROM SOLUTION

Richard A. Given, Lake Charles, La., assignor to Standard Oil Development Company, a corporation of Delaware Application December 31, 1943, Serial No. 516,356

4 Claims. (Cl. 260—678)

1

This invention relates to the separation of acetylenes from butadiene and particularly to the separation of acetylenes from a copper solution containing both acetylenes and butadiene.

Butadiene, when used in the manufacture of synthetic rubber, is required to be substantially free of acetylenes, that is, the maximum allowance of acetylenes is generally 0.10 weight per cent based on the butadiene. Therefore, usually acetylenes must be removed or separated from butadiene. The general process used heretofore was to absorb the acetylenes and butadiene in a copper solution such as ammoniacal cuprous acetate and heat the solution containing both butadiene and acetylenes in a soaking drum until substantially all of the acetylenes are polymerized. The disadvantage of using this process is that large soaking vessels and a high solvent inventory are required to fill the soaking vessels. Another disadvantage is that facilities for the removal of the liquid and solid polymers formed are likewise required.

An object of this invention is to provide a method where less apparatus is required to separate acetylenes from a cuprous solution containing both acetylenes and butadiene.

Figure 1:
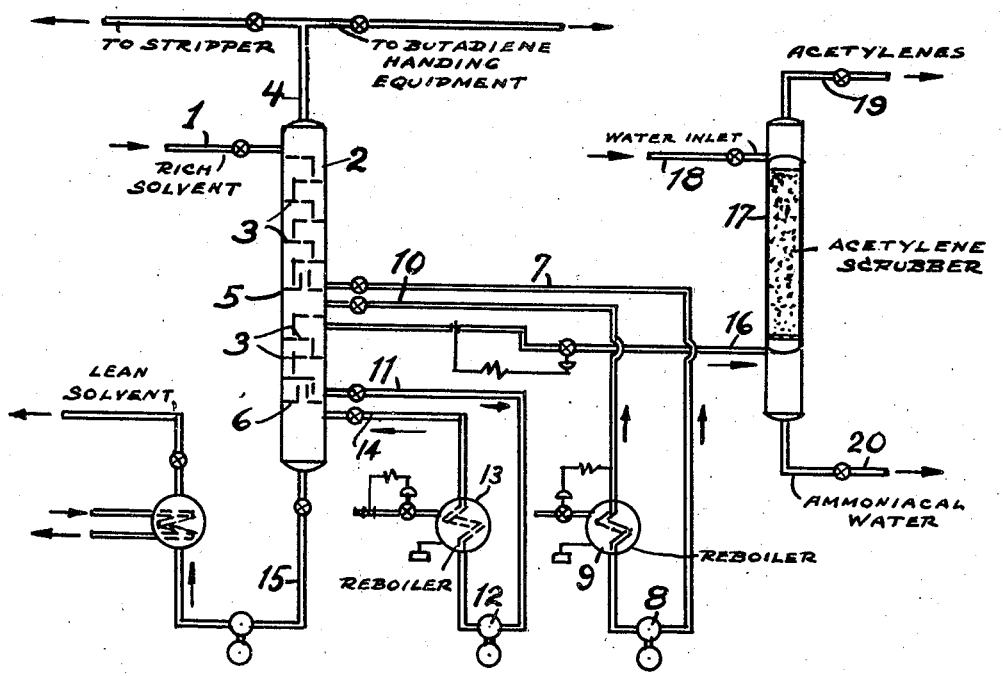
Figure 2:
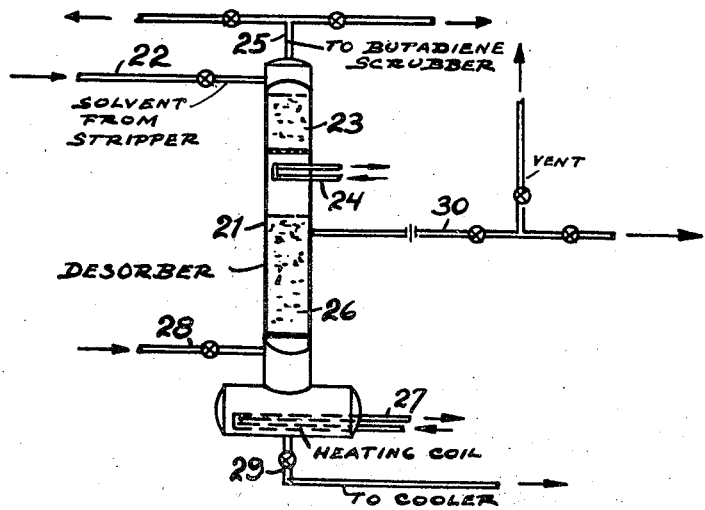
Figure 3:
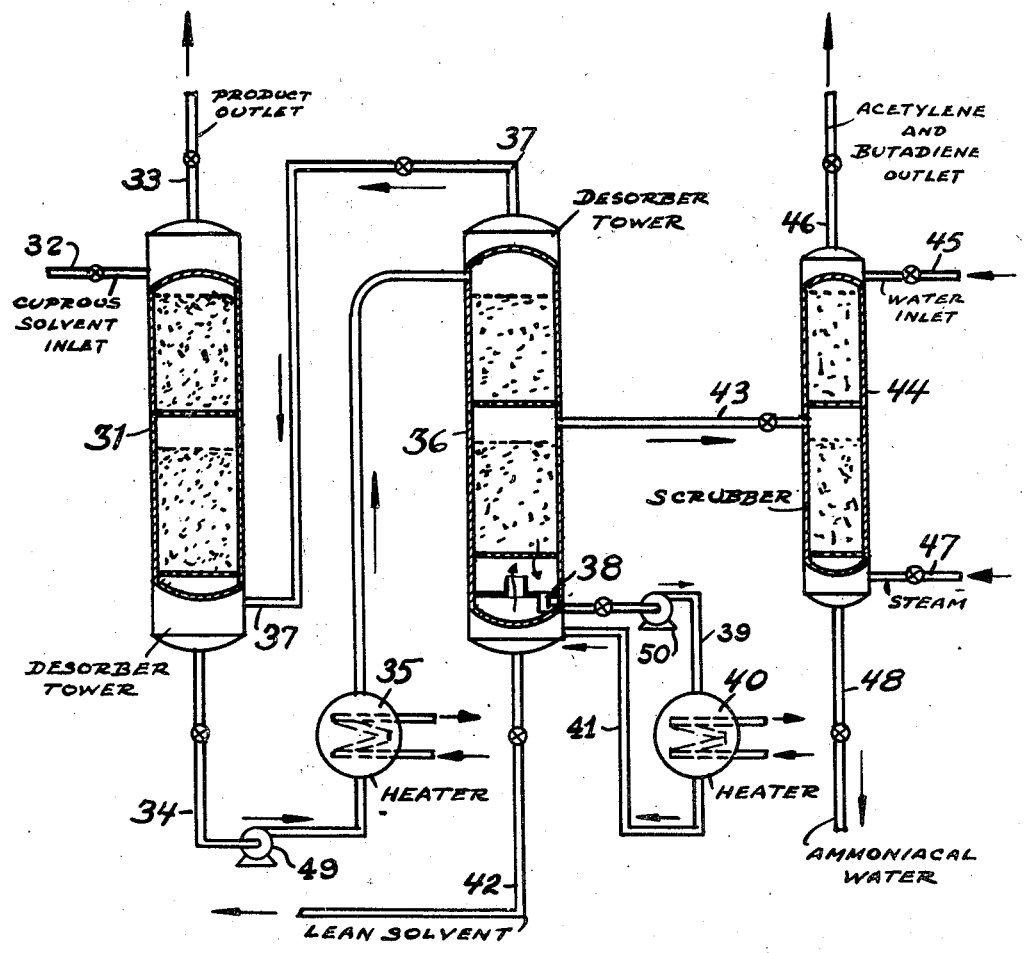
Figure 4:
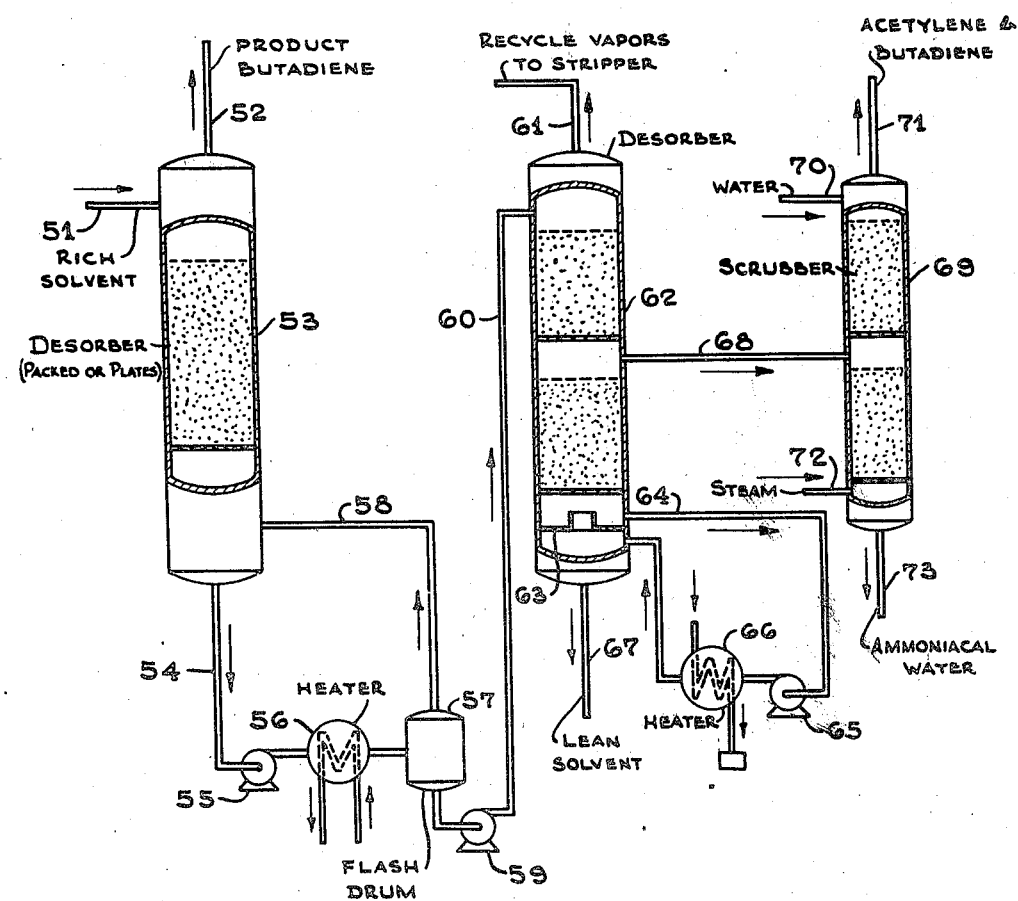

This object and other objects of the invention will be clearly understood upon reading the following description with reference to the accompanying drawings, Fig. 1 showing a flow sheet, partly in section, of the method used, Fig. 2 showing a diagrammatic sectional view of one particular type of desorber that may be used, and Fig. 3 and Fig. 4 showing two different arrangements that may be incorporated in the method.

Referring to Fig. 1, a rich solvent obtained from an absorption section (not shown) and containing absorbed therein butadiene and acetylenes is charged into the upper part of a desorber 2, the desorber being provided with a series of perforated plates 3 and pans 5 and 6 and pipe 4 for the removal of butadiene. The rich solvent is introduced into the desorber at a temperature of about 70–85° F. where a pressure ranging from 6–25 lbs./sq. in. gauge is maintained. The rich solvent flows downwardly over plates 3 and is gathered in pan 5 where it is removed by means of pipe 7, circulated by means of pump 8 through heater 9 and returned to a point below pan 5 by means of pipe 10. The temperature of the solvent is raised to about 155° F. This solvent on passing to the desorber 2 expels butadiene and a small amount of acetylenes. The solvent further passes down over plates 3 to pan 6 where it is removed by means of pipe 11 and passed by means of pump

2

12 through heater 13 and pipe 14 to a lower part of desorber 2. The temperature of the solvent as it is returned to the desorber is raised to about 180° F., at which temperature substantially all of the butadiene and acetylenes are expelled from the solvent. The solvent free of butadiene and acetylenes is removed through pipe 15 and after being passed through a cooler is recycled to the absorption system. At a point below pan 5 and below where the solvent heated in heater 9 is returned to the desorber, vapors which are very high in their acetylene content are withdrawn by means of pipe 16 and passed to the acetylene scrubber 17 where water being introduced into the scrubber by pipe 18 is passed in countercurrent flow to the acetylenes, the acetylene being removed by means of pipe 19 and the ammoniacal solution by means of pipe 20.

Referring to Fig. 2, a different type of desorber is shown, that is, instead of using plates, packed sections are used and heating coils. The rich solvent is introduced into desorber 21 by means of pipe 22 at a temperature of about 70° F. The rich solvent flows downwardly through a packed section and as it leaves the upper packed section 23, it is heated by heating coil 24 to a temperature of about 90° F. Butadiene is expelled through pipe 25 at the upper part of the desorber. The solvent passes through a second packed section 26 and further heated to a temperature of about 180° to 192° F. by means of heating coil 27 in the lower part of desorber 21. The heated vapors as they arise through packed section 26 raise the temperature to about 170° F. Ammonia is introduced into the lower part of the heating section by means of pipe 28. The solvent free of butadiene and acetylenes is removed by means of pipe 29, and acetylenes are removed by means of pipe 30 at a point in the desorber where the temperature is about 170° F. in the upper part of the packed section 26. The vapors are rich in acetylenes and contain only a minor proportion of butadiene.

Referring to Fig. 3, the cuprous solvent containing butadiene and acetylenes in solution is passed by means of pipe 32 into a desorber 31. The temperature of the solvent introduced into the desorber is about 85° F. An outlet pipe 33 is provided to remove the butadiene from the desorber 31. Desorber 31 may contain plates or packed sections. The solvent as it flows downwardly over the plates or through the packed sections is removed at its lower part by means of pipe 34 and passed by means of pump 49 through heater 35 into a second tower 36. The temperature of the solvent passed into the second tower ranges from 150–170° F., preferably 155° F. An outlet pipe 37 is provided to recycle any vapors given off in desorber 36, which vapors are passed into the lower part of desorber 31. Desorber 36 may likewise contain plates or packed sections. The solvent as it passes downwardly through the desorber 36 is finally gathered in pan 38, where it is removed through pipe 39, circulated by pump 50 through heater 40 and returned by means of pipe 41 to a point below pan 38. The temperature of the solvent returned to desorber 36 ranges from 170–190° F. A lean solvent is removed from the bottom part of desorber 36 by means of pipe 42. At the center portion of the desorber 36 a pipe 43 is provided to remove vapors which are passed to scrubber 44. These vapors consist of about 8% acetylenes and 2% of butadiene, the remainder being ammonia and water. Water is introduced into scrubber 44 by means of pipe 45 to remove ammonia from the vapors, and the acetylenes and butadiene are removed through pipe 46. Steam is introduced into the lower part of the scrubber 44 by means of pipe 47. The ammoniacal water is removed by means of pipe 48.

Referring to Figure 4 a modification of the system outlined in Figure 3 is shown. Rich solvent containing dissolved butadiene and acetylenes enters desorber 53 through line 51 at about 70 to 90° F. This desorber contains either packing or bubble plates and operates at a pressure of 6–25 pounds per square inch gauge. As the solvent flows down through the tower butadiene is desorbed and leaves through line 52. Solvent passes from the bottom of the tower through line 54 and pump 55 through heater 56 into flash drum 57. In the flash drum the solvent, having been heated to about 155° F., rejects a large portion of the butadiene which it originally contained. This rejected vapor consisting of butadiene, ammonia, water and some acetylenes return to desorber 53 through line 58. The partially desorbed solvent is withdrawn from drum 57 by pump 59 and flows into desorber 62 through line 60. Desorber 62 also may contain either packing or bubble plates. The solvent descends desorber 62 and is collected on pan 63. It is circulated through line 64 by pump 65 into heater 66. Herein it is heated to 170–190° F. and returned to desorber 62 below the pan 63. The solvent now contains essentially no butadiene and a very low concentration of monomeric acetylenes. This lean solvent flows from desorber 62 through line 67 and is returned to the extractor section of the plant. As the solvent flows down through desorber 62 the acetylenes are stripped from the solvent in the hot lower section, are partially reabsorbed in the upper section and thus tend to concentrate in the middle of the tower. A vapor stream is withdrawn from the middle section of desorber 62 through line 68. These vapors consist of approximately 8% acetylenes, 2% butadiene and the remainder, ammonia and water. The vapors not withdrawn in this manner pass through the upper section of the tower where they contact a countercurrent flow of solvent and a considerable portion of the acetylenes are thereby reabsorbed. Vapors leave the top of desorber 62 through line 61 and are recycled to the stripping section of the plant. The vapor sidestream withdrawn from desorber 62 enters the middle of scrubber 69 wherein ammonia is scrubbed from the vapors by a descending stream of water which enters through line 70. A vapor stream consisting essentially of acetylenes and butadiene passes from the top of scrubber 69 through line 71. Steam is introduced into the scrubber 69 through line 72 to strip acetylenes from the ammoniacal solvent descending from the upper section of the tower. Ammoniacal water leaves the bottom of the tower through line 73.

With this system the pressure in desorber 62 is independent of that in desorber 63. Thus by operating desorber 62 at a low pressure of 3–6 lbs. per sq. in. gauge it is possible to reduce the acetylene content of the lean solvent to the desired low value without having to resort to excessively high temperatures. Polymerization is thereby held to a minimum. This system has a further advantage in that it reduces the quantity of acetylenes taken overhead from desorber 53 with the product butadiene. The vapors from the top of desorber 62 contain appreciable quantities of acetylenes. By recycling them to the stripping section of the plant, the acetylene reabsorption job for desorber 53 is considerably reduced. The acetylene vapors are essentially completely reabsorbed in the cold stripping section of the plant, whereas acetylene are only partially reabsorbed from the vapors rising in the desorber.

I claim:

1. In the separation of acetylenes and butadiene from an ammoniacal cuprous salt solution containing initially butadiene and acetylenes absorbed therein, the improvement which comprises passing said initial cuprous salt solution containing butadiene and acetylenes absorbed therein to the upper part of a desorber tower and flowing it downwardly therein countercurrent to an upwardly flowing gaseous stream containing butadiene, withdrawing butadiene from the top of said desorber tower, withdrawing cuprous solution from the bottom of said desorber tower and heating it to a temperature of about 155° F. to produce said gaseous stream containing butadiene, introducing the residual portion of the cuprous solution from said heating step into a second tower where it is passed in countercurrent flow to a gas containing acetylenes, withdrawing cuprous solution from the bottom of said second tower and heating it to a temperature ranging from 170° to 190° F. to produce said gas containing acetylenes, withdrawing gases from the top of said second tower, contacting said cuprous salt solution containing butadiene and acetylenes dissolved therein, prior to its entry into said second tower, with said gases withdrawn from the top of said second tower, withdrawing from the midsection of said second tower a side stream of gas rich in acetylenes and containing butadiene and ammonia and washing the ammonia from said side stream with water to obtain a product rich in acetylenes.

2. In the separation of acetylenes and butadiene from an ammoniacal cuprous salt solution containing initially butadiene and acetylenes absorbed therein, the improvement which comprises passing said initial cuprous salt solution to the upper part of a desorption zone and flowing it downwardly therein countercurrent to an upwardly flowing gaseous stream containing butadiene, withdrawing butadiene from the top of said desorption zone, heating the cuprous solution leaving the bottom of said zone to a temperature of about 155° F. to produce said gaseous stream containing butadiene, which is caused to flow upwardly in said zone, continuing the downward flow of said heated solution in a second zone countercurrent to an upwardly flowing second gas stream containing acetylenes, further heating the said solution to a temperature ranging from 170 to 190° F. near the lower portion of said second zone to produce said second gas stream containing acetylenes, which is caused to flow upwardly in said second zone, withdrawing from said countercurrent contact with said first heated solution at a point below the top of said second zone as a side stream a portion of said gas containing acetylenes and also containing butadiene and ammonia and washing the ammonia from said side stream with water to obtain a product rich in acetylenes and contacting said cuprous salt solution containing butadiene and acetylenes dissolved therein, prior to its entry into said second zone, with gases withdrawn from the top of said second zone.

3. In the separation of acetylenes and butadiene from a cuprous salt solution containing initially butadiene and acetylenes absorbed therein, the improvement which comprises passing said initial cuprous salt solution to the upper part of a desorption zone and flowing it downwardly therein countercurrent to an upwardly flowing gaseous stream containing butadiene, withdrawing butadiene from the top of said desorption zone, heating the cuprous solution leaving the bottom of said zone to a temperature sufficient to produce said gaseous stream containing butadiene which is caused to flow upwardly in said zone, continuing the downward flow of said heated solution in a second zone countercurrent to an upwardly flowing second gas stream containing acetylenes, further heating the said solution near the lower portion of said second zone to produce said second gas stream containing acetylenes, which is caused to flow upwardly in said second zone, withdrawing from said countercurrent contact with said first heated solution at a point below the top of said second zone as a side stream a portion of said gas containing acetylene and also containing a relatively small proportion of butadiene and contacting said cuprous salt solution containing butadiene and acetylenes dissolved therein, prior to its entry into said second zone, with gases withdrawn from the top of said second zone.

4. In the separation of acetylenes and butadiene from an ammoniacal cuprous salt solution containing butadiene and acetylenes dissolved therein, the improvement which comprises passing said cuprous salt solution containing butadiene and acetylene dissolved therein into a packed tower and flowing it countercurrent to a butadiene-containing gas obtained as hereinafter set forth, withdrawing butadiene from the top of said tower, removing the residual cuprous salt solution from the bottom of said tower and heating it to a temperature in the range 150° to 170° F., introducing the heated solvent into the upper portion of a second tower and flowing it in countercurrent contact with acetylene-containing gas obtained by withdrawing cuprous salt solution from the bottom of the second tower and heating it to a temperature ranging from 170° to 190° F., withdrawing gas from the top of said second tower and introducing it into said first packed tower as said butadiene-containing gas, withdrawing a gas containing about 8% of acetylenes and 2% of butadiene and ammonia from a midsection of the second tower, washing the ammonia from said gas with water and recovering substantially pure acetylenes and butadiene.

RICHARD A. GIVEN.

REFERENCES CITED

The following references are of record in the file of this patent:

UNITED STATES PATENTS

| Number | Name | Date |
| --- | --- | --- |
| 2,235,119 | Robey | Mar. 18, 1941 |
| 2,154,676 | Haeuber et al. | Apr. 18, 1939 |
| 1,977,659 | Watts | Oct. 23, 1934 |
| 2,035,409 | Ruthruff et al. | Mar. 24, 1936 |
| 1,919,594 | Lewis | July 25, 1933 |
| 2,324,112 | Rupp et al. | July 13, 1943 |
| 1,934,029 | Asbury | Nov. 7, 1933 |
| 2,180,386 | Balcar | Nov. 21, 1939 |
| 2,356,986 | Frey | Aug. 29, 1944 |
| 2,371,817 | Frey | Mar. 20, 1945 |
| 2,388,928 | Morrell et al. | Nov. 13, 1945 |
| 2,389,658 | Fasce et al. | Nov. 27, 1945 |